Sept. 2, 1952     J. A. RYDBERG     2,608,956
CIRCULATION INDUCING DEVICE FOR RETURN WATER
CONNECTION IN HEATING BOILERS
Filed Feb. 1, 1949

*INVENTOR.*
JOHN ANDERS RYDBERG
BY

*ATTORNEY*

Patented Sept. 2, 1952

2,608,956

UNITED STATES PATENT OFFICE 2,608,956

CIRCULATION INDUCING DEVICE FOR RETURN WATER CONNECTION IN HEATING BOILERS

John Anders Rydberg, Stockholm, Sweden, assignor to Aktiebolaget Gustavsbergs Fabriker, Gustavsberg, Sweden, a corporation of Sweden Application February 1, 1949, Serial No. 73,889
In Sweden January 30, 1948

4 Claims. (Cl. 122—159)

This invention relates to a device in heating boilers of the kind equipped with a fuel storage compartment or magazine, in which at least some of the vertical walls consists of water-filled spaces where the colder return water is to be mixed, at the top of the heating boiler, with the hot water contained therein.

According to this invention, a channel is built into such a vertical water space and is open at the top as well as at the bottom, with the downwardly pointing end of an inlet nozzle for return water discharging into the upper part of the channel in such a manner that the incoming return water by injector action is made to draw hot water from the boiler top into the channel, which forms a mixing chamber, and to mix there with the return water.

The injector action is obtained by the return water entering at comparatively high speed. Owing to efficient mixing resulting in this way, the temperature of the return water is increased considerably (for instance 15 to 25 deg. C.) prior to coming into contact with the heating surface of the boiler. This prevents condensation and consequently any corrosion on the heating surface of the boiler, which otherwise will occur owing to the entrained gases containing sulphur, acetic acid etc.

The injector action is completed by giving the mixing chamber such a shape that is widens at its lower end to obtain a diffuser effect, i. e., converting energy of movement into energy of pressure. The inlet nozzle as well as the mixing chamber can be constructed by employing suitable partitions built into the vertical water space. It is also suitable to let the inlet nozzle as a surrounding part of the vertical water space, form horizontal, boxshaped extensions at the top.

The proposed return connection with injector mixer can be used in connection with several boiler types. This invention comprises, however, also a heating boiler with such a return water mixer and in other respects constructed as disclosed in my copending application Serial No. 73,888, filed February 1, 1949.

Figure 1:
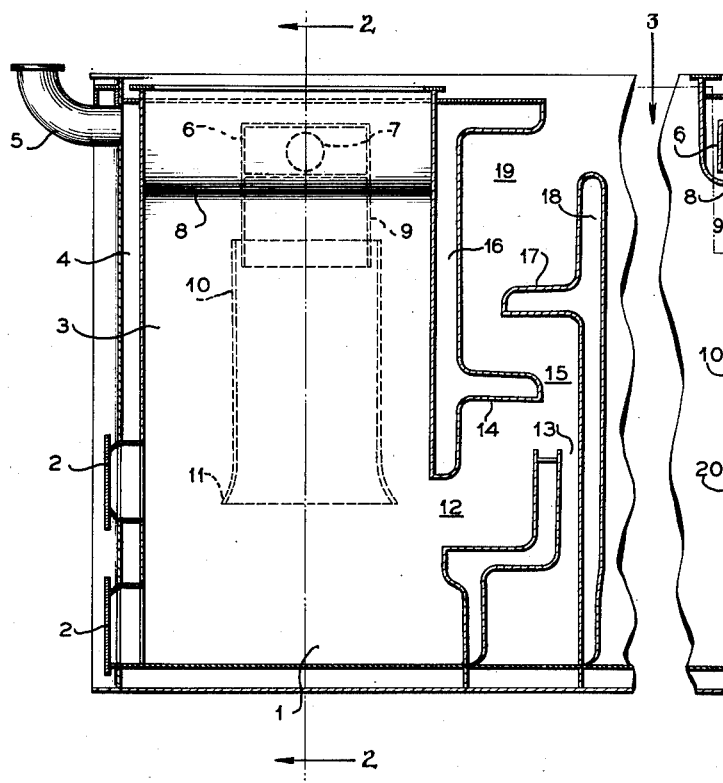
Figure 2:
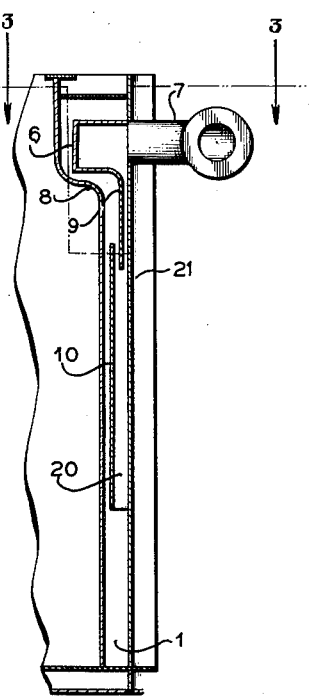
Figure 3:
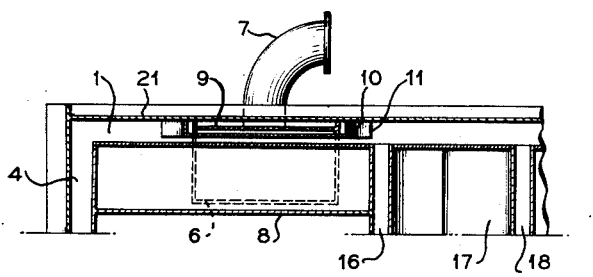

The invention is shown by way of example in the accompanying drawing, in which Fig. 1 is a longitudinal section through the boiler part shown, Fig. 2 a cross section through a longitudinal side of the boiler on the line 2—2 of Fig. 1, and Fig. 3 a horizontal section through the last mentioned boiler side on the line 3—3 of Figure 2.

The boiler part shown consists of a shaft-shaped fuel storage compartment 3, surrounded partly by longitudinal side walls 1, so extended that they cover the whole boiler (only shown in the parts really of interest in this connection) and partly by a front cross wall and a rear cross wall, 4 and 16 respectively. All these walls, 1, 4 and 16 form vertical, water-filled spaces or water legs. The front wall 4 of the boiler is equipped with furnace doors 2 and a rising main connection 5. The rear wall 16 of fuel storage compartment 3 forms together with a following vertical and also water-filled wall 18 a secondary combustion or flame chamber 19 for the fuel gases generated in fuel storage compartment 3. These gases have an exit from fuel storage compartment 3 to secondary combustion chamber 19 through an opening 12 in the lower part of wall 16. From walls 16 and 18 horizontal ledges 14 and 17 extend, which provide a winding inlet passage 15 for the fuel gas flow to the secondary combustion chamber 19. At a suitable point in this passage 15 a secondary air inlet 13 is provided.

One longitudinal water space 1 of the heating boiler merges at the top into a horizontal water box 8. Return water connection 7 continues into this box 8 with a likewise substantially box-shaped inlet nozzle 6, enclosed in water box 8 and opening only downwardly so that it forms an inlet channel 9 for the return water, adjoining outside plate 21 of wall 1. In the narrow part of water space 1 there is built in a partition 10 of such shape that it forms together with outside plate 21 a vertical open channel 20, into the upper part of which the inlet channel 9 enters. Channel 20 is constructed with a discharge opening 11 widening towards its lower end.

When in operation, hot water is delivered to the heating system supplied by the boiler through the boiler outlet 5 and the chilled water returns to the boiler through the return connection 7. The return water flows from the return box downwardly through the relatively restricted return channel 9 which operates to increase the velocity of the return water. The discharge from the channel 9 is into the open channel 20, in which, by injector action, the return water creates a downward flow which draws hot water from the upper part of the water leg into channel 20 to mix with the cold return water and raises the temperature of the latter. At the lower end channel 20 is widened to form a diffuser for decelerating the rate of downward flow of water in channel 20 before it is delivered to the lower part of the water leg, in which the normal movement of the water being heated is upward.

With the arrangement shown the plate on the fire or combustion side of the water leg is separated from the return water and normal upward flow of hot water in the space between the partition 10 and the inner plate is maintained, thus avoiding chilling the latter plate.

What I claim is:

1. In a heating boiler having wall structure providing a vertical water leg with an inner and an outer wall, a channel structure vertically positioned within said leg and providing a mixing chamber of restricted cross-sectional area as compared with that of the leg, said chamber being defined in part by the outer wall of the leg and communicating at its top and bottom with the water space of said leg and a nozzle of slightly less cross sectional area than said chamber disposed in said leg for discharging return water into the upper part of said channel structure to draw hot water from the top of the boiler into said channel structure to mix with the return water in said chamber and be discharged into a lower portion of said water leg due to the ejector action of said nozzle.

2. A structure as set forth in claim 1 in which said channel structure is widened at its lower end to provide a diffuser section.

3. In a heating boiler having wall structure providing a vertical water leg with an inner and outer wall, a channel structure vertically positioned within said leg and providing a mixing chamber of restricted cross-sectional area as compared with that of the leg, said chamber being defined in part by the outer wall of the leg and communicating at its top and bottom with the water space of said leg, and a nozzle for discharging return water into the boiler, said nozzle structure comprising an upper portion communicating with the return water conduit leading to the boiler and a depending discharge portion for delivering water to said mixing chamber.

4. A structure as set forth in claim 3 in which said outer wall of the water leg defines in part both the mixing chamber and the nozzle structure and the internal depending portion of the nozzle structure extends downwardly into the upper portion of the mixing chamber in spaced relation to the inner wall of said channel structure.

JOHN ANDERS RYDBERG.

REFERENCES CITED

The following references are of record in the file of this patent:

UNITED STATES PATENTS

| Number | Name | Date |
|---|---|---|
| 114,666 | Gordon | May 9, 1871 |
| 178,244 | Koll | June 6, 1876 |
| 428,695 | Roake | May 27, 1890 |
| 547,045 | Sturtevant | Oct. 1, 1895 |
| 835,872 | Ssiway | Nov. 13, 1906 |
| 985,834 | Parker | Mar. 7, 1911 |
| 989,812 | Schmidt | Apr. 18, 1911 |
| 1,032,197 | Fletcher | July 9, 1912 |
| 1,809,888 | Crane | June 16, 1931 |
| 1,980,424 | Morgan | Nov. 13, 1934 |
| 2,262,748 | Berman | Nov. 18, 1941 |

FOREIGN PATENTS

| Number | Country | Date |
|---|---|---|
| 85,078 | Sweden | Dec. 17, 1935 |
| 176,372 | Germany | Oct. 25, 1906 |
| 751,785 | France | June 26, 1933 |